United States Patent [19]
Maeda et al.

[11] Patent Number: 5,204,764
[45] Date of Patent: Apr. 20, 1993

[54] ELECTRO-OPTICAL DEVICE HAVING A FIRST AND A SECOND NONLINEAR RESISTANCE ELEMENT FORMED ON EACH PIXEL ELECTRODE

[75] Inventors: Takeshi Maeda; Koji Iwasa, both of Tokyo, Japan

[73] Assignee: Seiko Instruments, Inc., Japan

[21] Appl. No.: 657,490

[22] Filed: Feb. 15, 1991

[30] Foreign Application Priority Data

Mar. 9, 1990 [JP] Japan .................................. 2-59090

[51] Int. Cl.$^5$ .............................................. G02F 1/13
[52] U.S. Cl. .......................................... 359/60; 359/58; 359/79
[58] Field of Search ........... 350/333, 334, 336, 339 R; 340/784; 359/58, 59, 60, 87, 79; 357/4, 23.7

[56] References Cited

U.S. PATENT DOCUMENTS

| | | | |
|---|---|---|---|
| 4,728,175 | 3/1988 | Baron | 350/336 |
| 4,810,059 | 3/1989 | Kuijk | 359/59 |
| 4,828,370 | 5/1989 | Suzuki | 350/339 R |
| 4,842,372 | 6/1989 | Toyama | 350/334 |
| 4,868,616 | 9/1989 | Johnson et al. | 350/333 X |
| 4,871,234 | 10/1989 | Suzuki | 350/333 |
| 4,890,097 | 12/1989 | Yamashita et al. | 359/59 |
| 4,961,630 | 10/1990 | Baron et al. | 350/333 |
| 4,983,022 | 1/1991 | Shannon | 350/333 |
| 4,994,796 | 2/1991 | Kuijk | 350/333 X |

FOREIGN PATENT DOCUMENTS

0233489 8/1987 European Pat. Off. ............ 350/333

*Primary Examiner*—William L. Sikes
*Assistant Examiner*—Huy K. Mai
*Attorney, Agent, or Firm*—Bruce L. Adams; Van C. Wilks

[57] ABSTRACT

Disclosed is an electro-optical device comprising two opposite substrates, a material having an electro-optical effect and sealed between the two opposite substrates, a large number of row electrodes formed on one of the two opposite substrates, a large number of column electrodes formed on the other of the two opposite substrates, and pixel electrodes, pixel electrodes arranged in a matrix form on at least one of the two opposite substrates, and nonlinear resistance elements arranged in a matrix form on at least one of the two opposite substrates, wherein a plurality of nonlinear resistance elements are formed on each of the pixel electrodes, the each pixel electrode is connected to a first row or column electrode through a first nonlinear resistance element and to a second row or column electrode through a second nonlinear resistance element, a signal is applied to the pair of row electrodes or column electrodes to control the resistances of the pair of nonlinear resistance element to cause the nonlinear resistance element to serve as a switch, and data is written from the column electrodes or row electrodes, thereby suppressing variations in charge injection amounts caused by nonuniform characteristics and deteriorations over time of the nonlinear resistance element, and at the same time suppressing variations in leakage amounts by data patterns, and hence arbitrarily and accurately controlling an RMS voltage.

3 Claims, 4 Drawing Sheets

ELECTRO-OPTICAL DEVICE HAVING A FIRST AND A SECOND NONLINEAR RESISTANCE ELEMENT FORMED ON EACH PIXEL ELECTRODE

BACKGROUND OF THE INVENTION

1. Field of the Invention

The present invention relates to an electro-optical device using a pixel electrode and nonlinear resistance elements for a unit pixel formed along an operating electrode.

2. Description of the Related Background Art

A liquid crystal display panel has advantageous features such as a thin thickness and lightweight display panel having low power consumption and is currently used in a variety of applications, for example, in laptop or book type personal computers. Of conventional liquid crystal display panels, an active matrix display panel has received a great deal of attention due to its high resolution, and high image quality. Typical active elements are a three-terminal element using a thin film transistor, and a two-terminal element represented by a nonlinear resistance element (e.g., a MIM (Metal Insulator Metal) resistance element) and a p-n junction thin film diode.

Of these conventional active elements, a three-terminal element is produced through a complicated fabrication process, so that a low yield and high cost are inevitable in inconvenience. The diode referred above has a low breakdown voltage and is susceptible to static electricity. To the contrary, a nonlinear resistance element has a simple structure and a high breakdown voltage of 25 V or more. Therefore, the nonlinear resistance element can be utilized for a display panel having a large area at low cost.

FIG. 2A is a circuit diagram showing an X-Y matrix panel circuit in a conventional electro-optical device using nonlinear resistance elements, FIG. 2B is a sectional view showing a structure of the unit cell of the device, and FIG. 2C is a plan view showing a structure of the nonlinear resistance element. Referring to FIGS. 2A to 2C, 100 to 1,000 row electrodes 1 and 100 to 1,000 column electrodes 2 are generally formed on a substrate B and a counter substrate A, respectively. Each X-Y intersection has a pixel electrode 22 and a nonlinear resistance layer 21 to constitute a nonlinear resistance element 4 connected to a corresponding one of the column electrodes 2. An electro-optical material 3 is sealed between the substrates A and B. When this structure is used as a liquid crystal display panel, the substrates A and B are generally made of glass, the row and pixel electrodes 1 and 22 are generally made of ITO (Indium Tin Oxide), the column electrode 2 is generally made of Cr or Al, and the nonlinear resistance layer 21 is generally made of Si-rich silicon nitride.

The operation of the liquid crystal display panel of this type is performed as follows. The row electrodes 1 (column electrodes 2) in FIGS. 2A to 2B are sequentially selected one by one, and data is written by each corresponding column electrode 2 (row electrode 1) in the selected period. At this time, in order to perform a display with a sufficient contrast ratio (e.g., a contrast ratio of 10:1, or more), an RMS (Root-Mean-Square) voltage applied to a liquid crystal at the selected pixel must be higher than a saturation voltage of the liquid crystal, and an RMS voltage applied to the liquid crystal during a non-selected pixel must be lower than a threshold voltage of the liquid crystal. The nonlinear resistance element 4 has characteristics defined such that a resistance of the element is exponentially changed by the voltage applied thereto. For this reason, a higher voltage is set to be applied to the selected pixel of the nonlinear resistance element 4 within a selected period to decrease the element resistance (e.g., $10^8$ Ω or less), so that charges can be easily injected into the pixel electrode 22. At the half-selected pixel, a voltage applied to the nonlinear resistance element 4 is suppressed to be low within the selected period. In this case, the resistance of the element is not decreased (e.g., $10^9$ Ω or more), and charges tend not to be injected into the pixel electrode 22. During a retention period, a low voltage is applied to both the selected and the non-selected pixels of the nonlinear resistance element 4, and the resistance of the non-linear element is kept high (e.g., $10^{11}$ Ω or more), thereby increasing the charge retention capacity of the element. As is apparent from the above description, when the nonlinear resistance element is used, the RMS voltage applied to the liquid crystal can be kept higher than the saturation voltage of the liquid crystal at the selected pixel and lower than the threshold voltage at the non-selected pixel. Therefore, a high contrast ratio can be obtained even if the number of dots is increased.

In order to perform a display on this liquid crystal display panel, it is important to determine the driving voltage, the composition and thickness of the nonlinear resistance layer, and the structure of the nonlinear resistance element 4 so as to obtain desired resistances of the nonlinear resistance element 4 during the selected and retention periods. It is also important to increase a ratio of a capacitance $C_{LC}$ of a liquid crystal portion of each pixel to a capacitance $C_1$ of a nonlinear resistance element portion of each pixel (at least $C_{LC}/C_1 \geq 5$) so as to obtain a sufficient operating margin and to compensate for a distribution of element characteristics and their deviation over time.

As described above, although the display panel using nonlinear resistance elements can have a large capacity, a problem is posed if a gray-scale display is to be performed in addition to simple turned on/off display, as compared with a three-terminal element due to the following reason. Since each three-terminal element is operated as a perfectly independent switch, a given charge injected into one pixel rarely receives an influence of a charge written in another pixel during a retention period of the given charge. In the nonlinear resistance element, however, a very small current (up to about 10 pA) flows even during the retention period. Data stored in other pixels gradually influence data stored in respective pixels through the corresponding column electrodes (row electrodes). For this reason, the RMS voltage applied to the liquid crystal in accordance with a display pattern is gradually deviated from the predetermined value. In addition, since the resistance of the element greatly influences the charge injection capacity and the charge retention capacity, element characteristics vary within the panel surface and are shifted due to deteriorations over time. At this time, changes in element characteristics cause a direct change in the RMS voltage applied to the liquid crystal. For this reason, when an RMS voltage applied to the liquid crystal is to be controlled with high precision as in a multilevel gray-scale display, a contrast difference is caused to make it difficult to perform a normal display.

This difference is increased when the panel size is increased and the number of dots is increased, resulting in inconvenience.

SUMMARY OF THE INVENTION

It is an object of the present invention to solve the conventional problems described above.

It is another object of the present invention to provide an electro-optical device wherein a plurality of nonlinear resistance elements are arranged in units of pixel electrodes, two adjacent operating electrodes are connected through independent nonlinear resistance elements, the resistance of the nonlinear resistance element is controlled by using the pair of operating electrodes to provide a stable operation against variations in characteristics of the nonlinear resistance element and deteriorations over time, and data input to one pixel is not adversely affected by data input to other pixels.

It is still another object of the present invention to provide an electro-optical device, wherein a plurality of nonlinear resistance elements are arranged in units of pixel electrodes, two adjacent operating electrodes are connected through independent nonlinear resistance elements, and the resistance of the nonlinear resistance element is controlled by using the pair of operating electrodes to allow the nonlinear resistance element to serve as a more perfect switch.

It is still another object of the present invention to provide an electro-optical device capable of performing a stable, accurate, high-quality display such as a gray-scale display in a panel using nonlinear resistance elements.

It is still another object of the present invention to improve the data write capacity and provide uniform display characteristics even if a distribution or deteriorations over time occur in element characteristics.

It is still another object of the present invention to improve the data retention capacity and perform a stable and arbitrary display regardless of the types of patterns to be displayed.

It is still another object of the present invention to stabilize a potential level of a pixel electrode during a selected period and facilitate control by a data signal, thereby accurately displaying gray-scall levels.

The above and other objects, features, and advantages of the present invention will be apparent from the following detailed description and the appended claims in conjunction with the accompanying drawings.

BRIEF DESCRIPTION OF THE DRAWINGS

FIGS. 3A to 3F are waveform charts showing a method of operating the electro-optical device shown in FIGS. 1A to 1C, in which FIG. 3A is a chart showing an input waveform for a first operating electrode, FIG. 3B is a chart showing an input waveform for a second operating electrode, FIG. 3C is a chart showing an input waveform for a counter electrode when all pixels are selected, FIG. 3D is a chart showing an input waveform for a counter electrode when all pixels are non-selected, FIG. 3E is a chart showing an input waveform for a counter electrode when a specific pixel is selected and the remaining pixels are not selected, and FIG. 3F is a chart showing an input waveform for a counter electrode when a specific pixel is not selected and the remaining pixels are selected.

DETAILED DESCRIPTION OF THE PREFERRED EMBODIMENT

Figure 1A:
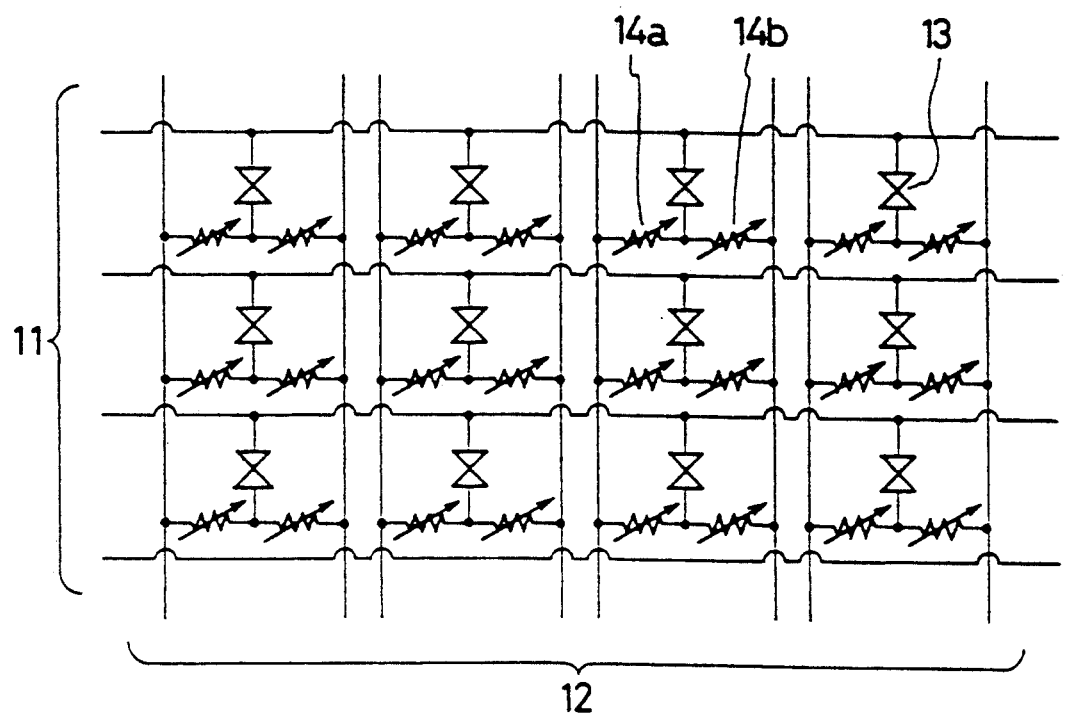
FIG. 1A is a circuit diagram of an X-Y matrix panel of an electro-optical device according to an embodiment of the present invention.
Figure 1B:
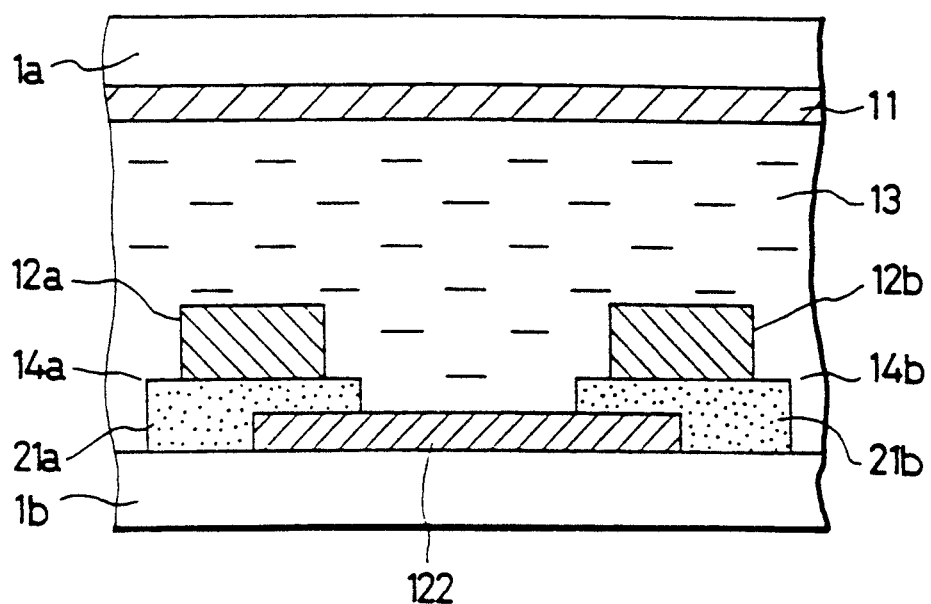
FIG. 1B is a sectional view showing a structure of the electro-optical device shown in FIG. 1A.
Figure 1C:
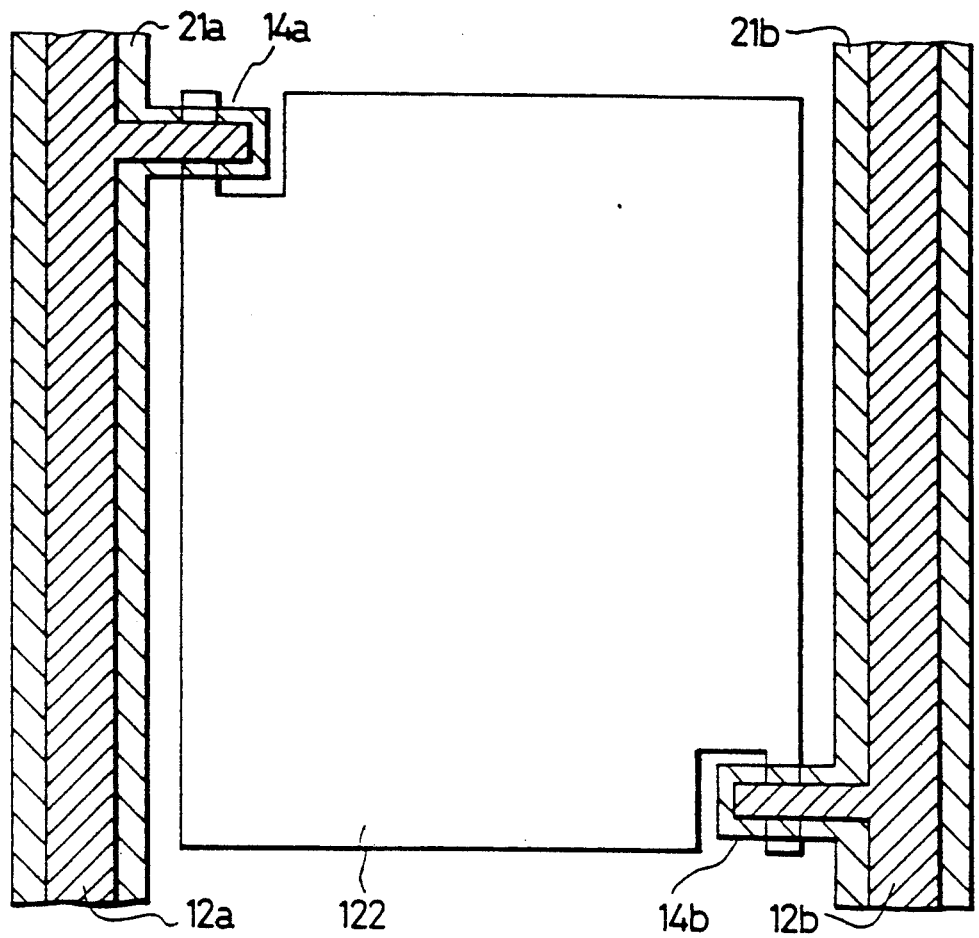
FIG. 1C is a plan view showing a structure of a nonlinear resistance element of the electro-optical device shown in FIG. 1A.
Figure 2A:
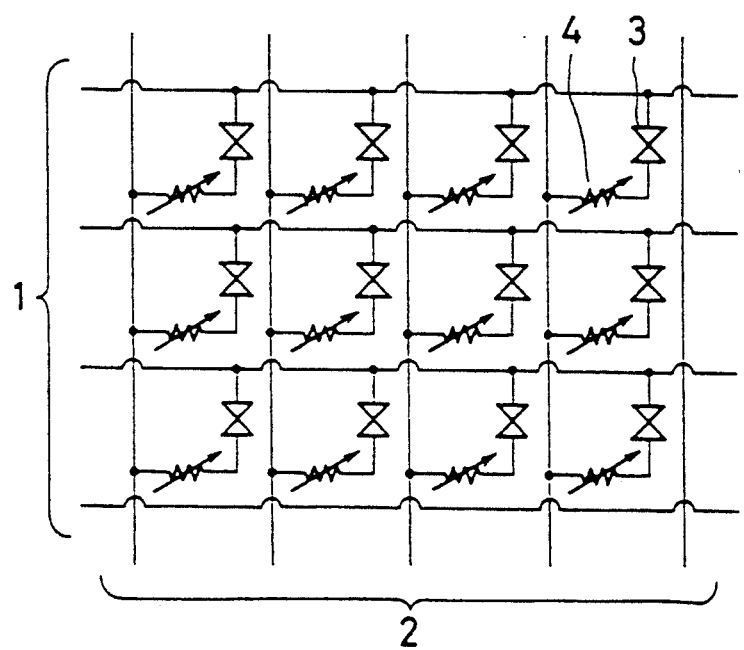
FIG. 2A is a circuit diagram of an X-Y matrix panel of a conventional electro-optical device.
Figure 2B:
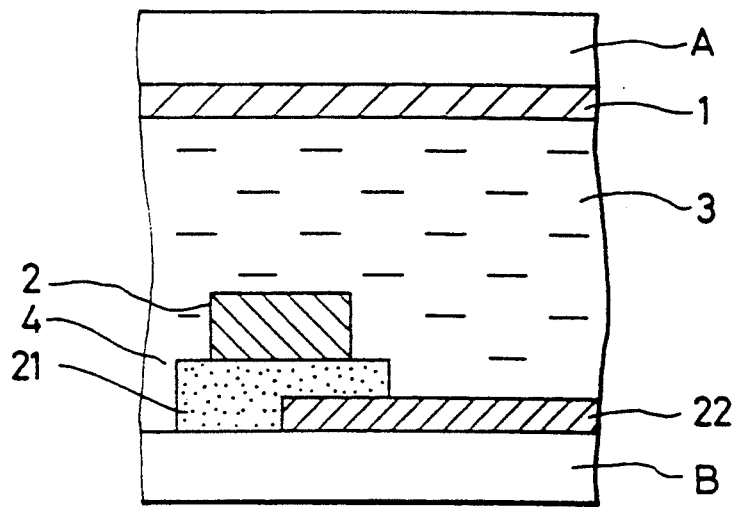
FIG. 2B is a sectional view showing a structure of the conventional electro-optical device shown in FIG. 2A.
Figure 2C:
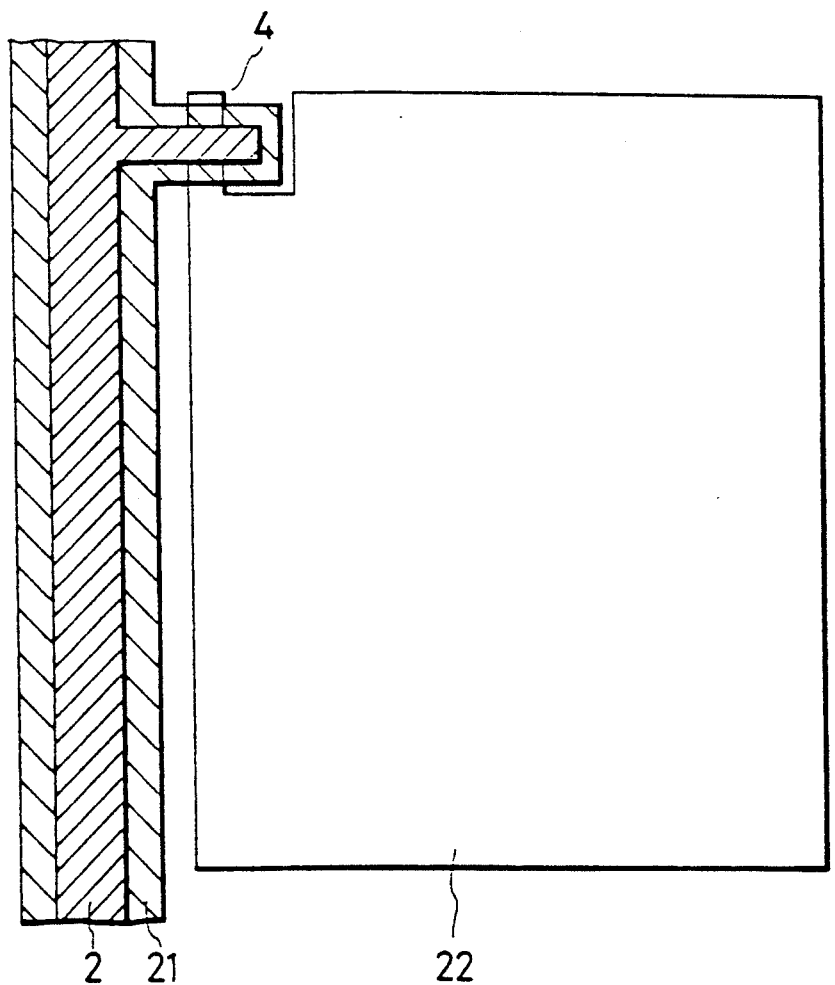
FIG. 2C is a plan view showing a structure of a nonlinear resitance element of the electro-optical device shown in FIG. 2A.

An embodiment of the present invention will be described in detail with reference to the accompanying drawings. FIG. 1A is a circuit diagram of an X-Y matrix panel of an electro-optical device according to an embodiment of the present invention, FIG. 1B is a sectional view showing part of a structure thereof, and FIG. 1C is a plan view showing a structure of a nonlinear resistance element. Referring to FIGS. 1A to 1C, a plurality of pixel electrodes 122 are formed on a substrate 1b. These electrodes are formed by depositing, e.g., ITO by sputtering, and selectively etching the deposited ITO film. Nonlinear resistance layers 21a and 21b (e.g., Si-rich SiNx) and operating electrodes 12a and 12b (e.g., Cr) are continuously deposited in the order named, and are continuously etched to connect each pixel electrode 122 to the first operating electrode 12a through a first nonlinear resistance element 14a and to the second operating electrode 12b through a second nonlinear resistance element 14b. A counter electrode 11 (e.g., ITO) is formed on a counter substrate 1a. An electro-optical material 13 (e.g., a liquid crystal) is sealed between the counter substrate 1a and the substrate 1b.

Figure 3A:
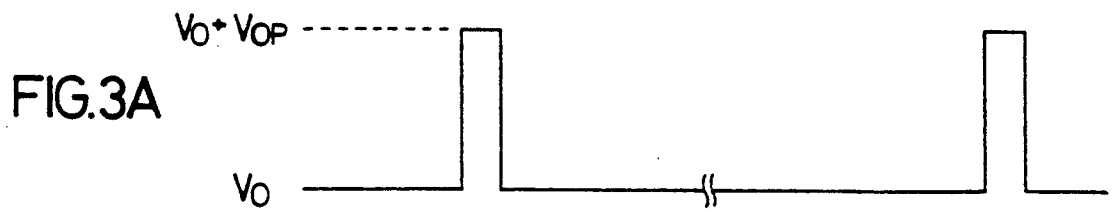
Figure 3B:
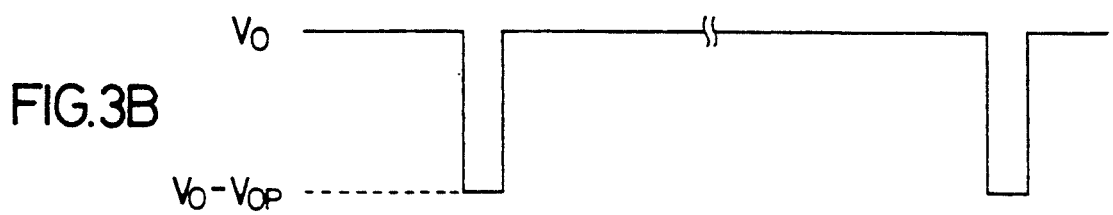

The electro-optical device having the above arrangement will be operated as follows. Each pair of the large number of operating electrodes 12 in FIG. 1A are sequentially selected, and data is written by the counter electrode 11 within a selected period. FIGS. 3A to 3F are charts showing a method of operating the electro-optical device according to the present invention. FIG. 3A shows an input waveform for the first operating electrode 12a, FIG. 3B shows an input waveform for the second operating electrode 12b, and FIGS. 3C to 3F show input waveforms for the counter electrode 11. Referring to FIG. 3A, a potential of the operating electrode 12a is kept at $V_O$ in a non-selected state but at $V_O + V_{OP}$ in a selected state. Referring to FIG. 3B, a potential of the operating electrode 12b is kept at $V_O$ in a non-selected state but at $V_O - V_{OP}$ in a selected state. At this time, since the two nonlinear resistance elements 14a and 14b are located very close to each other, their characteristics are regarded to be identical to each other. The potential of the pixel electrode 122 is always kept at about $V_O$. Voltages applied to one nonlinear resistance element are very close to $V_O$ and $V_{OP}$ in the nonselection and selection states respectively. When a sufficiently high voltage (e.g., a voltage which causes the resistance of the element to be $10^8 \Omega$ or less) is applied as $V_{op}$, the nonlinea resistance element has a low resistance ($10^8 \Omega$ or less) in the selected state and a high resistance ($10^{12} \Omega$ or more) in the nonselected state. In this manner, the nonlinear resistance element can be operated as a perfect switch.

Figure 3C:
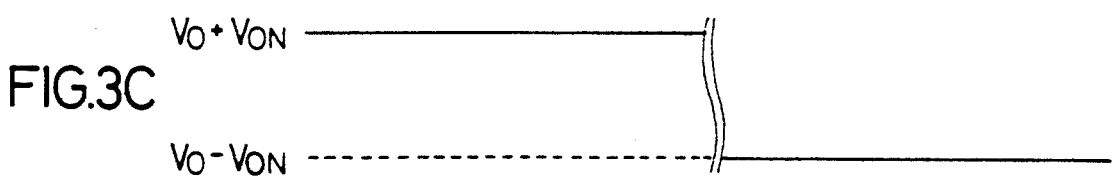
Figure 3D:
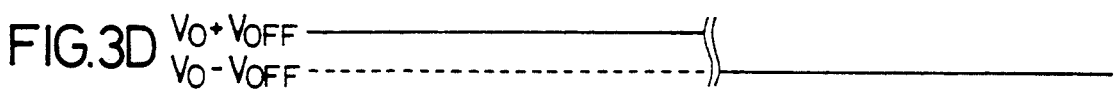
Figure 3E:
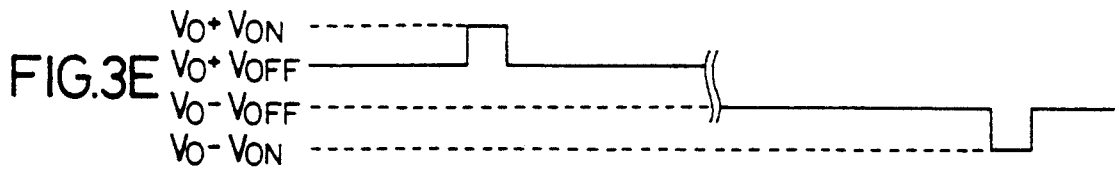
Figure 3F:
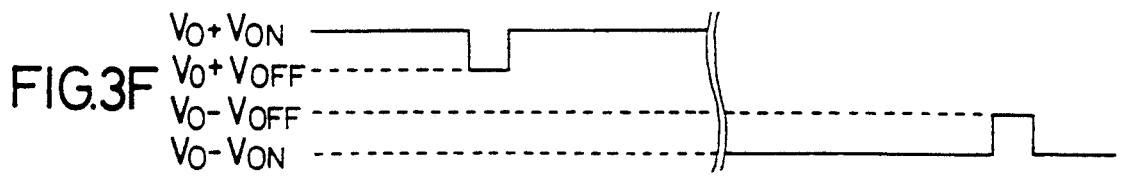

FIGS. 3C, 3D, 3E, and 3F show input waveforms for the counter electrode for data patterns to be written in all pixels aligned along one counter electrode. FIG. 3C shows a case wherein all the pixels are selected, FIG. 3D shows a case wherein all the pixels are non-selected, FIG. 3E shows a case wherein one pixel is selected and the remaining pixels are not selected, and FIG. 3F shows a case wherein one pixel is not selected and the remaining pixels are all selected. During a selected period, each nonlinear resistance element has a low resistance ($10^8$ Ω or less). As a result of charge injection, a voltage applied to the electro-optical material 13 is given as $V_{ON}$ when the corresponding pixel is selected. A voltage applied to the electro-optical material 13 is given as $V_{OFF}$ when the corresponding pixel is not selected. Data inversion is performed for every cycle to prevent the electro-optical material 13 from characteristic degradation by a DC bias when the electro-optical material 13 consists of a liquid crystal.

A charge stored in the pixel electrode 122 during the selected period is not easily discharged regardless of changes in potential of the counter electrode 11 since the nonlinear resistance elements are kept in a high-resistance ($10^{12}$ Ω or more) state during a charge retention period. An RMS voltage applied to the electro-optical material 13 is mostly determined by counter electrode data stored during the selected period, and influences from input data to other pixels can be perfectly reduced. The fact that the RMS voltage applied to the electro-optical material 13 is determined in accordance with the counter electrode data indicates that an operation of this device does not depend much on the characteristics of the nonlinear resistance element due to the following reason. Since charge injection and retention need only be performed by the nonlinear resistance element, the voltage $V_{OP}$ is set to a value sufficient to set all the element resistances to be $10^8$ Ω or less. Under this condition, even if variations or deteriorations over time occur in the element characteristics, the element resistances can be set to be values low enough to sufficiently perform write access. In this manner, the nonlinear resistance element can be reliably operated as a switch.

The nonlinear resistance element used in the present invention may comprise amorphous silicon; silicon nitride, silicon oxide, silicon carbide or silicon oxynitride whose silicon content is larger than a stoichiometric ratio. Such nonlinear resistance elements may contain hydrogen, or at least one of phosphorus and boron.

As has been described above, according to the present invention, a plurality of nonlinear resistance elements are formed on each pixel electrode and are operated by a pair of operating electrodes adjacent to each pixel electrode, so that the nonlinear resistance elements can have a highly reliable switching function. Therefore, fine adjustment of each pixel can be stably performed. In practice, even if ±20% variations occurred in the characteristics of the nonlinear resistance element, it was confirmed that RMS voltages applied to a liquid crystal layer could fall within the range of ±0.1 V of the desired values for all display patterns.

The present invention is not limited to the particular embodiment described above. Various changes and modifications may be made without departing from the scope of the appended claims.

What is claimed is:

1. An electro-optical device comprising: two opposite substrates, a material having an electro-optical effect disposed between said two opposite substrates, row electrodes comprising a first row electrode and a second row electrode formed on one of the substrates, column electrodes formed on the other of the substrates, pixel electrodes arranged in a matrix form on at least one of the substrates, nonlinear resistance elements comprising a first nonlinear resistance element and a second nonlinear resistance element formed on respective peripheral portions of each pixel electrode, each pixel electrode being electrically connected to the first row electrode through the first nonlinear resistance element and electrically connected to the second row electrode through the second nonlinear resistance element, and the resistance values of the first and second nonlinear resistance elements being controlled by the voltage values applied to both the first and second row electrodes.

2. A electro-optical device according to claim 1, wherein each nonlinear resistance element comprises a layer essentially consisting of a material selected from the group consisting of silicon nitride, silicon oxide, silicon carbide and silicon oxynitride, whose silicon contents are greater than a stoichiometric ratio, and amorphous silicon.

3. An electro-optical device according to claim 2, wherein each nonlinear resistance element contains at least one of hydrogen, phosphorus and boron.

* * * * *